(12) United States Patent
Toda et al.

(10) Patent No.: US 6,192,067 B1
(45) Date of Patent: Feb. 20, 2001

(54) MULTISTAGE INTERFERENCE CANCELLER

(75) Inventors: Takeshi Toda; Yoshinori Tanaka, both of Kawasaki; Shuji Kobayakawa, Yokohama; Hiroyuki Seki; Masafumi Tsutsui, both of Kawasaki, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 08/995,251

(22) Filed: Dec. 19, 1997

(30) Foreign Application Priority Data

Dec. 20, 1996 (JP) .................................................... 8-340921

(51) Int. Cl.$^7$ ............................... H04B 15/00; H04B 7/26
(52) U.S. Cl. ......................... 375/144; 375/140; 375/346
(58) Field of Search .................................. 375/144, 148, 375/285, 346, 348, 140; 370/320, 335, 342

(56) References Cited

U.S. PATENT DOCUMENTS

| 4,761,796 | * | 8/1988 | Dunn et al. ........................... 375/133 |
| 5,467,368 | * | 11/1995 | Takeuchi et al. ..................... 375/148 |
| 5,550,810 | * | 8/1996 | Monogioudis et al. ............. 370/342 |
| 5,719,899 | * | 2/1998 | Thielecke et al. ................... 375/144 |

FOREIGN PATENT DOCUMENTS

| 2279851 | 1/1995 | (GB) . |
| WO 96/03819 | 2/1996 | (WO) . |

OTHER PUBLICATIONS

Improved CDMA Performance Using Parallel Interference Cancellation—pp. 911–917.

* cited by examiner

*Primary Examiner*—Young T. Tse
(74) *Attorney, Agent, or Firm*—Helfgott & Karas, P.C.

(57) ABSTRACT

A multistage interference canceller and method for removing interference between users and multipath interference from received signals in multiple stages includes a plurality of despreading units which produce a received symbol vector and an estimated channel value, a synthesis unit which synthesizes the received symbol vector, an amplitude of the received symbol vector and the amplitude of the estimated value from each reverse spreading unit, and a decision unit which executes a hard decision and a soft decision according to a result of comparing the total amplitude of the received symbol vector and the total amplitude of the estimated channel value.

3 Claims, 8 Drawing Sheets

MULTISTAGE INTERFERENCE CANCELLER

BACKGROUND OF THE INVENTION

1. Field of the Invention

The present invention relates to a multistage interference canceller to be used in Code Division Multiple Access (CDMA) communication systems. More particularly, the present invention relates to digital mobile radio communication systems that use a Direct Sequence Code Division Multiple Access (DS-CDMA) communication system. More particularly, the present invention relates to a method of tentative decision in the multistage interference canceller.

2. Description of the Related Art

The CDMA communication system is used for digital mobile radio communication systems in various countries. In this system, it is very important to improve the Signal-to-Interference Ratio (SIR) to decode received signals much more accurately. SIR can be adversely affected, for example, by interference from other users caused by the correlation between spreading codes.

The multistage interference canceller, which generates and removes interference replicas from received signals in multiple stages, is generally expected to improve SIR.

Figure 1:
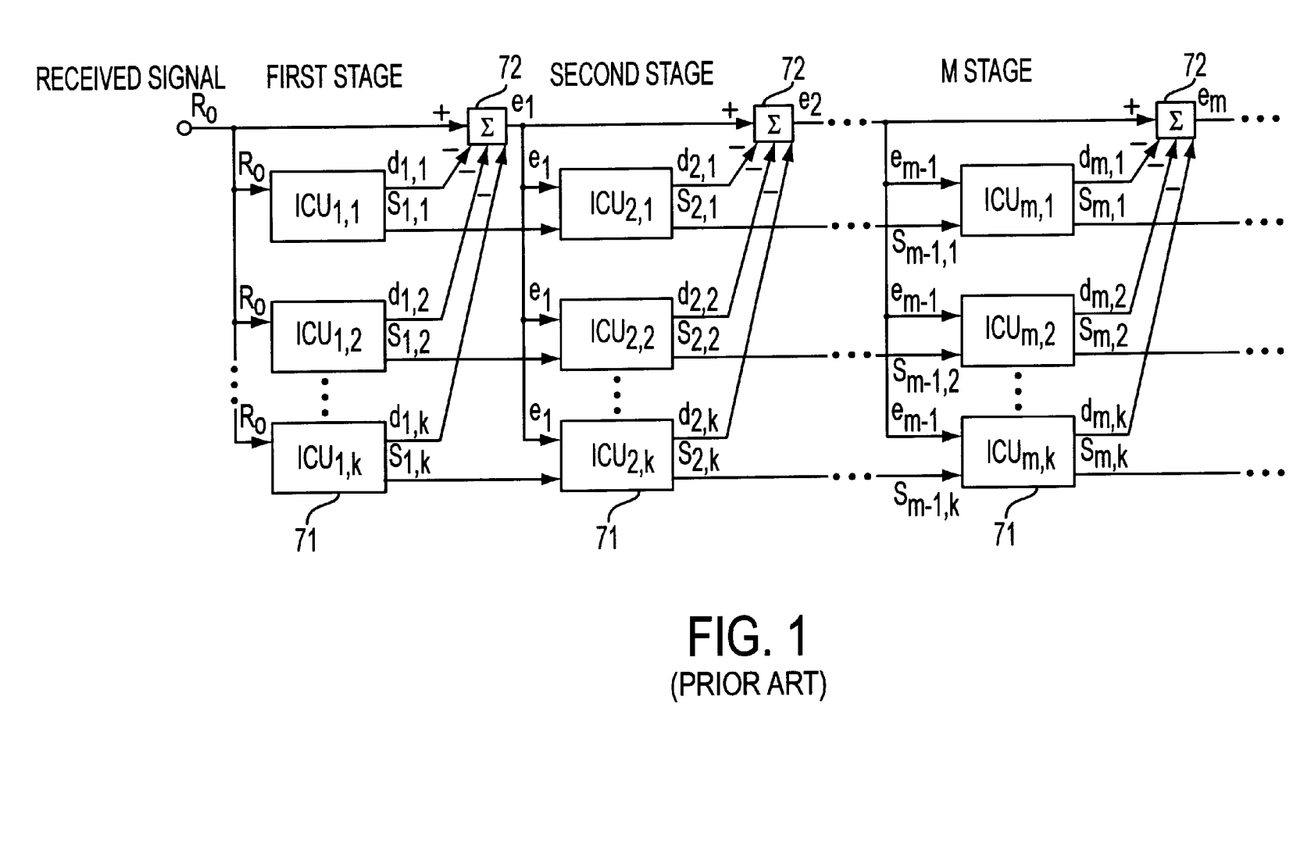
FIG. 1 shows the configuration of a conventional multistage interference canceller.

FIG. 1 shows a configuration example of a conventional multistage interference canceller. In this example, stages 1 to m are linked longitudinally. Each stage has interference canceller units (ICU) (71) and synthesis units (72). The subscripts attached to the names of interference canceller units (71) $ICU_{1,1} \sim ICU_{1,k}$, $ICU_{2,1} \sim ICU_{2,k}$, ..., and $ICU_{m,1} \sim ICU_{m,k}$ correspond to stage numbers "1" to "m" and user numbers "1" to "k."

In stage 1, received signal $R_0$ is input to interference canceller units $ICU_{1,1}$ to $ICU_{1,k}$ (which correspond to users). The interference canceller units then output interference replica signals $S_{1,1}$ to $S_{1,k}$ and estimated interference residual signals $d_{1,1}$ to $d_{1,k}$. The synthesis unit (72) synthesizes estimated interference residual signals $d_{1,1}$ to $d_{1,k}$, removes them from received signal $R_0$, and then outputs an error signal $e_1$.

In stage 2, error signal e1 from the synthesis unit (72) in stage 1 and interference replica signals $S_{1,1}$ to $S_{1,k}$ from interference canceller units $ICU_{1,1}$ to $ICU_{1,k}$ in stage 1 are input to interference canceller units $ICU_{2,1}$ to $ICU_{2,k}$. Next, the interference canceller units output interference replica signals $S_{2,1}$ to $S_{2,k}$ and estimated interference residual signals $d_{2,1}$ to $d_{2,k}$. The synthesis unit synthesizes estimated interference residual signals $d_{2,1}$ to $d_{2,k}$, removes them from error signal e1 input from stage 1, and then outputs error signal e2.

Similarly, in stage m, error signal $e_{m-1}$ (from the synthesis unit of the previous stage) and interference replica signals $S_{m-1,1}$ to $S_{m-1,k}$ (from the interference canceller units of the previous stage) are input. The interference canceller units in stage m then output interference replica signals $S_{m,1}$ to $S_{m,k}$ and estimated interference residual signals $d_{m,1}$ to $d_{m,k}$. Thus, the interference replica signals from which the interference between users and the multipath interference is removed can be obtained by the processing in each stage.

Figure 2:
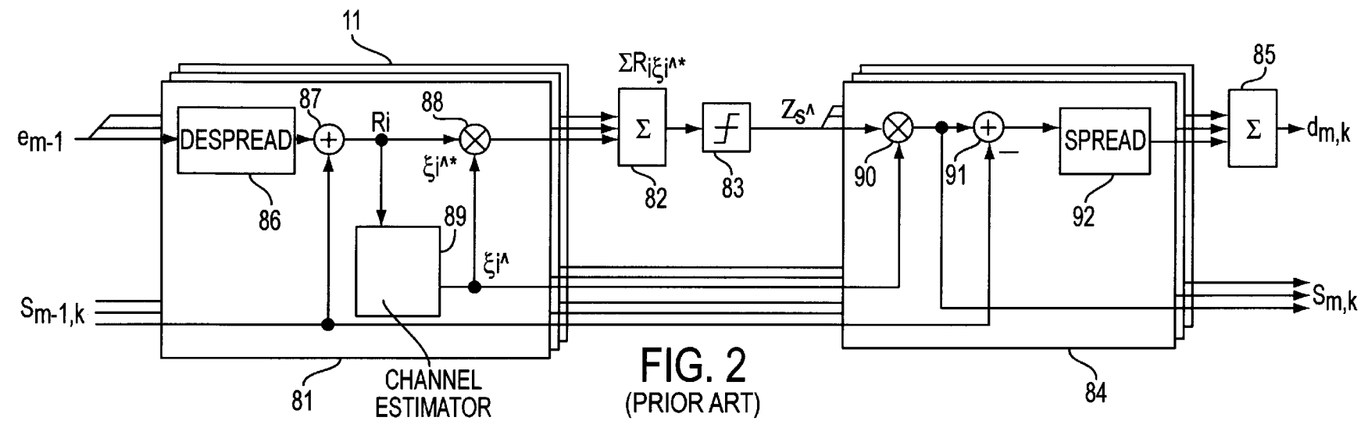
FIG. 2 shows the configuration of each interference canceller unit shown in FIG. 1.

FIG. 2 shows the configuration of each interference canceller unit (71) shown in FIG. 1. In this example, the interference canceller unit has a three-finger structure for rake (RAKE) synthesis. In FIG. 2, "81" indicates a despread unit, "82" a synthesizer, "83" a decision unit, "84" a spreading unit, "85" a synthesizer, and "86" a despreader.

Also, "87" indicates an adder, "88" a multiplier, "89" channel estimation, "90" a multiplier, "91" an adder, and "92" a spreader. In the following explanation, symbol "^" represents an estimated value and symbol "*" represents a complex conjugate number.

Error signal $e_{m-1}$ from the previous stage (received signal $R_0$ if stage m is stage 1) and interference replica signal $S_{m-1,k}$ from the previous stage (zero if stage m is stage 1) are input to the despread unit (81) corresponding to the delay profile (path) of the received signal. The despreader (86) demodulates error signal $e_{m-1}$ input from the previous stage in reverse according to a spreading code by despread. Note that in stage 1, received signal $R_0$ is input to the interference canceller in synchronization with the spreading code.

The signal spread in reverse and demodulated by the above despreader is added to the interference replica signal input from the previous stage by the adder (87). Received symbol vector $R_i$ is then generated for path i. Received symbol vector $R_i$ for path is input to channel estimation (89), which outputs an estimated value $\xi_i\hat{}$ of the channel (phasing vector) of path i. Channel estimation (89) estimates the value by using a pilot symbols included in the received signal. For instance, the estimated value of the phasing vector may refer to an error in the signal phase or amplitude caused by phasing in a radio channel.

The multiplier (88) multiplies received symbol vector $R_i$ by using complex conjugate number $\xi_i\hat{}^*$ of estimated channel value $\xi_i\hat{}$ for weighting and phase compensation in proportion to the amplitude of estimated channel value $\xi_i\hat{}$. The synthesizer (82) synthesizes the signal output from the multiplier (88) corresponding to the path at the maximum ratio.

The decision unit (83) temporarily evaluates synthesized received symbol vector $\Sigma R_i \xi_i\hat{}^*$. The synthesizer (83) outputs estimated information symbol vector $Zs\hat{}$ following hard decision of synthesized received symbol vector $\Sigma R_i \xi_i\hat{}^*$.

Output estimated information symbol vector $Zs\hat{}$ is input to the spreading unit (84). The multiplier (90) multiplies estimated information symbol vector $Zs\hat{}$ by estimated channel value $\xi_i\hat{}$ to generate interference replica signal $S_{m,k}$ for each path, then outputs the generated signal to the next stage.

The adder (91) subtracts interference replica signal $S_{m-1,k}$ from interference replica signal $S_{m,k}$ for each path, then outputs the result to the spreader (92). The spreader (92) despreads the signal input from the adder (91) according to the spreading code, then outputs the spread signal for each path to the synthesizer (85). The synthesizer (85) synthesizes the signals input from the synthesizer (85) and outputs estimated interference residual signal $d_{m,k}$.

As the above operation is executed for users in more stages, error signal em becomes closer to noise only, resulting in higher interference replica signal accuracy. Thus, a received signal (from which the interference between users and multipath interference is removed) can be obtained after rake reception processing using the error signal and interference replica signal in the final stage.

Figure 3:
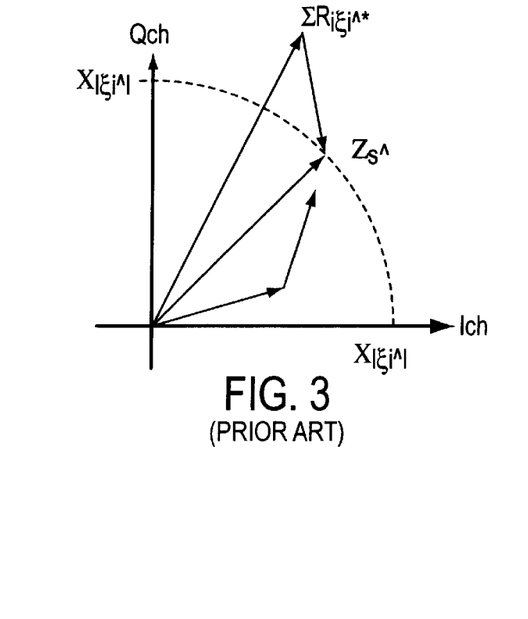
FIG. 3 shows an example of the signal space where a decision unit of the interference canceler unit executes hard decision of the received signal to which QPSK modulation is applied in the configuration shown in FIG. 2.

FIG. 3 shows an example of the signal space where the decision unit (83) executes hard decision of the received signal to which QPSK modulation is applied. FIG. 3 shows in detail the first quadrant of the signal space enclosed by Q channels. In this example, received symbol vector $\Sigma R_i \xi_i\hat{}^*$ is subject to hard decision to confirm that it is estimated information symbol vector $Zs\hat{}$. The phase of received symbol vector $\Sigma R_i \xi_i\hat{}^*$ is compensated so that it becomes a normal vector signal. Estimated information symbol vector Zs^ is then output as the signal after tentative decision at a level equivalent to the total amplitude of estimated channel value ξi^.

As previously described, the interference canceller unit corresponding to each user of a conventional multistage interference canceller has a decision unit (83). The decision unit (83) inputs and evaluates received symbol vector Σ $R_i ξ_i^{\wedge*}$ output after rake synthesis by the synthesizer (82). The decision unit (83) evaluates estimated information symbol vector Zs^ (as shown in FIG. 3) even when the signal level is abnormally high or low or the phase difference is large. The difference in phase or level occurs, for example some channel estimations use known pilot symbols which are periodically inserted every information data to estimate channel by interpolating the pilot symbols, to estimate value ξi^. The estimated value is also applied to information data and is not always optimum for every received signal due to the varying influence of phasing and noise upon received signals. The influence of phasing and noise can cause received symbol vector Σ $R_i ξ_i^{\wedge*}$ to differ significantly in level and phase from estimated information symbol vector Zs^ obtained by hard decision. If this occurs, the reliability of estimated information symbol vector Zs^ is lowered. If a less reliable estimated information symbol vector Zs^ is used to output interference replica and estimated interference residual signals to the next stage, the lowered capability of removing interference will cause a problem.

SUMMARY OF THE INVENTION

It is an object of this invention to provide an interference canceller with greater capability to remove interference.

Another purpose of this invention is to provide a highly accurate method of tentative decision in the interference canceller.

To attain these and other objects the present invention has a decision unit for changing hard and soft decision according to a result of comparing the total amplitude of a received symbol vector the total amplitude of an estimated channel value, preset value and phase difference.

DETAILED DESCRIPTION OF THE PRESENTED EMBODIMENTS

Figure 4:
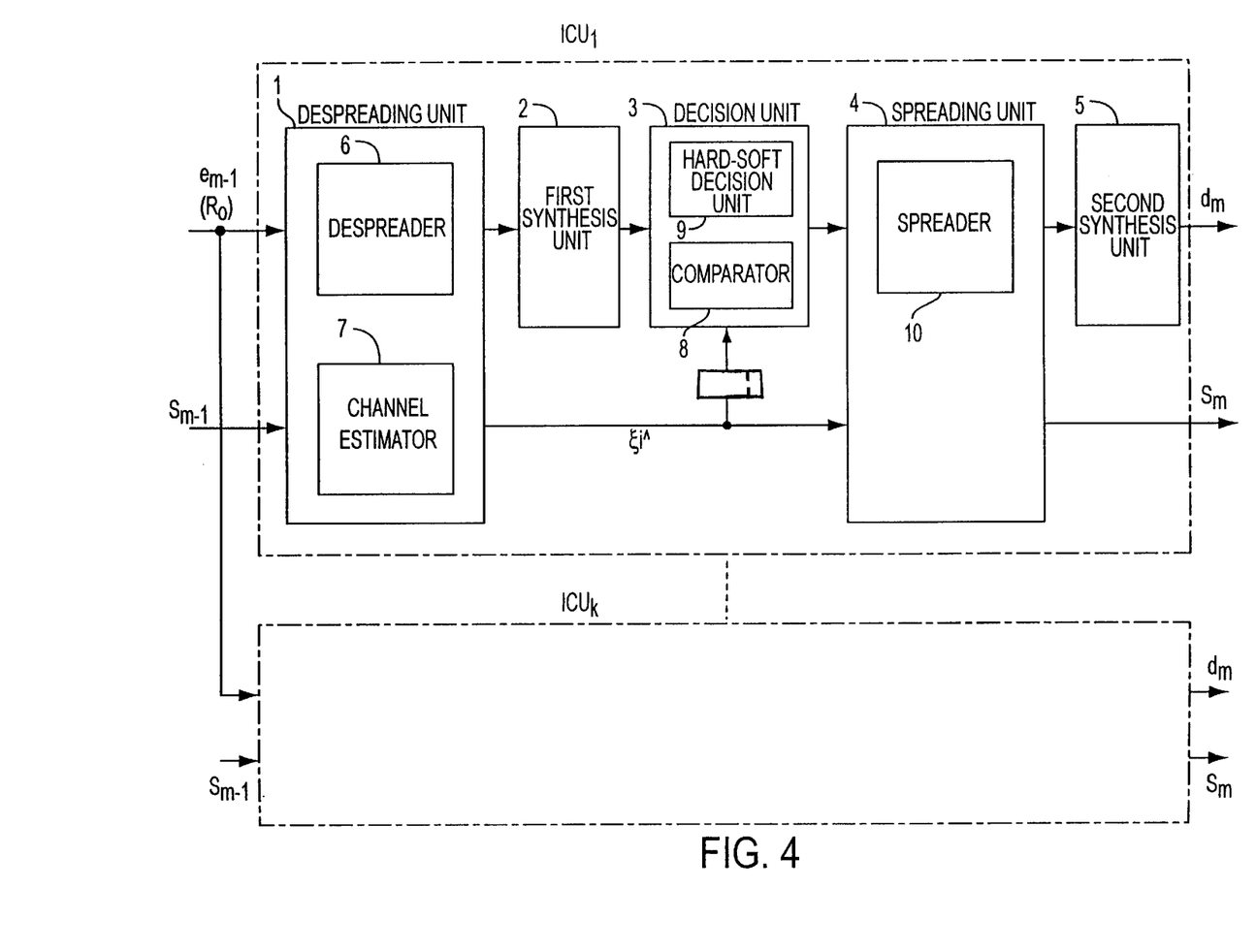
FIG. 4 shows an example of the configuration using an interference canceller according to the present invention.

FIG. 4 shows an embodiment of the interference canceller according to the present invention. Interference canceller units $ICU_1$ to $ICU_k$ corresponding to the users of each stage each include a despreading unit (1) having a despreader (6) and a channel estimation unit (7), and a first synthesis unit (2). These interference canceller units also have a decision unit (3) including a comparator (8) and a hard-soft decision unit (9) a spreading unit (4) with a spreader (10), and a second synthesis unit (5) coupled to the spreading unit 4.

Like the interference canceller shown in FIG. 2, this interference canceller of FIG. 4 has multiple despreading units (1) and spreading units (4) that correspond to the delay profiles (multipaths) for received signals. Each despreading unit (1) receives error signal $e_{m-1}$ and interference replica signal $S_{m-1}$ input and error signal $e_{m-1}$ from the previous stage. (If stage m is stage 1 of the multistage interference canceller, the error signal to be input is received signal $R_0$ and the interference replica signal to be input is zero.) The despreader (6) despreads in reverse, demodulates, and outputs input error signal $e_{m-1}$ according to a spreading code. The reversely spread, demodulated signal output from the despreader (6) becomes received symbol vector Ri after interference replica signal $S_{m-1}$ is added. Channel estimation unit (7) calculates estimated channel value ξi^ from input interference replica signal $S_{m-1}$, and then outputs the signal. The theory of calculation is the same as that for the channel estimation shown in FIG. 2. The complex conjugate number $ξi^{\wedge*}$ of estimated channel value ξi^ is multiplied by received symbol vector $R_i$, then the result is synthesized by the first synthesizer 2 by rake synthesis. The synthesized received symbol vector $Σ R_i ξ_i^{\wedge*}$ is output to the decision unit (3).

The comparator (8) in the decision unit (3) compares the total amplitude $Σ|ξ_i^{\wedge}|$ of the estimated channel value ξi^ with the total amplitude $Σ|R_i ξ_i^{\wedge*}|$ of the synthesized received symbol vector output from the first synthesis unit (2).

When the result of comparison is as follows, the hard-soft decision unit (9) in the decision unit (3) executes hard decision:

$Σ|ξ_i^{\wedge}| ≤ Σ|R_i ξ_i^{\wedge*}|$

When the result of comparison is as follows, the hard-soft decision unit (9) in the decision unit (3) executes soft decision:

$Σ|ξ_i^{\wedge}| > Σ|R_i ξ_i^{\wedge*}|$

Estimated information symbol vector Zs^ output from the decision unit (3) is multiplied by estimated channel value ξi^ in the spreading unit (4), then is output as the interference replica signal $S_m$ to the next stage. Interference replica signal $S_{m-1}$ from the previous stage is also subtracted from interference replica signal $S_m$, then the result is spread by the spreader (10) according to the spreading code. The spread signal is synthesized by the second synthesis unit (5), and output as an estimated interference residual signal $d_m$.

The interference canceller executes soft decision for a received symbol vector low in level and reliability. A decision error caused by soft decision can be reduced compared to that caused by hard decision, thus improving the interference replica signal accuracy.

Figure 5:
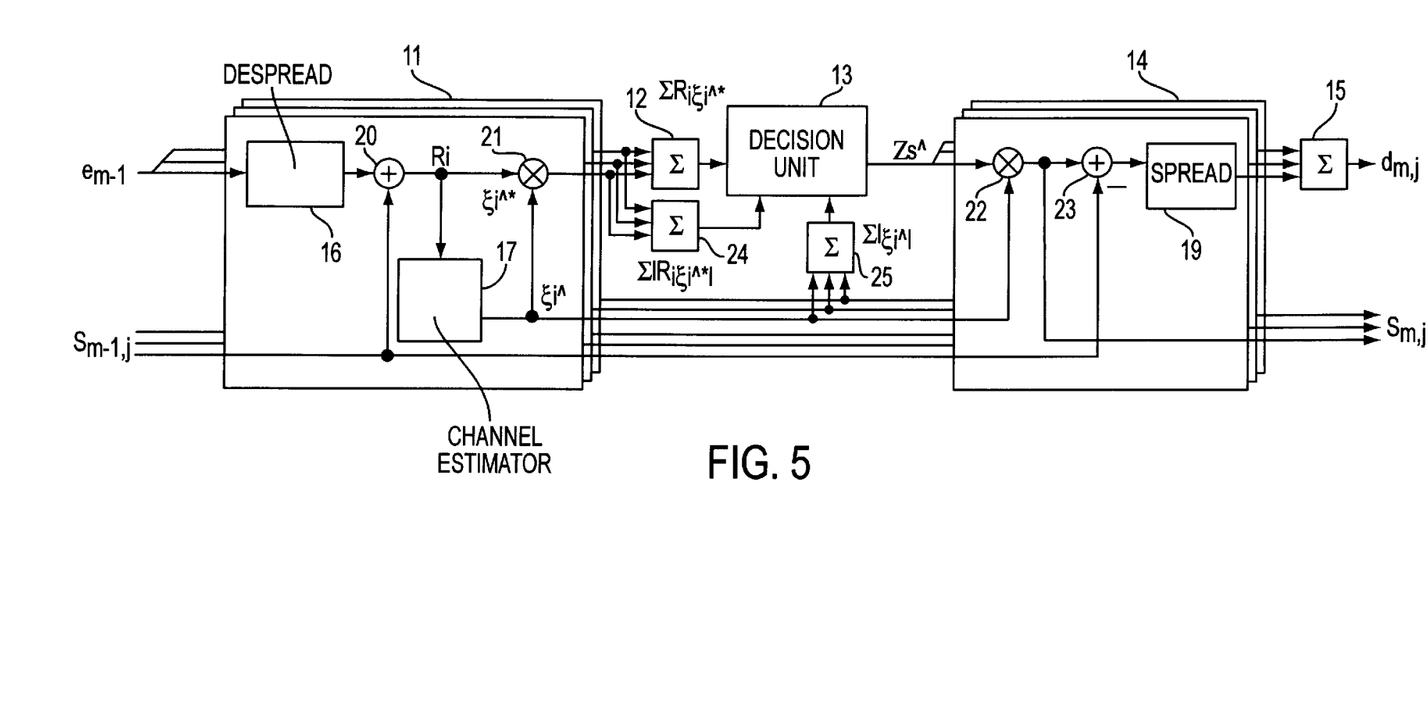
FIG. 5 shows another configuration example using the interference canceller of the present invention.

FIG. 5 shows another embodiment of the interference canceller of the invention. In FIG. 5, "11" indicates a despreading unit, "12" a first synthesizer ($\Sigma$), "13" a decision unit, "14" a spreading unit, "15" a second synthesizer ($\Sigma$), and "16" a despreader. Also, "17" indicates a channel estimation unit "19" a spreader, "20" an adder, "21" and "22" multipliers, "23" an adder, and "24" and "25" synthesizers ($\Sigma$).

Error signal $e_{m-1}$ from the previous stage (received signal $R_i$ if in stage 1) and interference replica signal $S_{m-1,j}$ from the previous stage (zero if stage m is stage 1) are input. Both signals are input to the despreading unit (11) corresponding to the delay profile (path i) of the received signal (as in the operation shown in FIG. 2). The despreader (16) despreads an input error signal $e_{m-1}$ in reverse according to the spreading code and demodulates the signal. Note that in stage 1, received signal $R_0$ is input to the interference canceller in synchronization with the spreading code.

The adder (20) adds the signal spread in reverse and demodulated by the above despreader and the interference replica signal input from the previous stage to generate received symbol vector Ri for path i. Received symbol vector $R_i$ for path i is input to channel estimation (17), which outputs estimated value $\hat{\xi}i$ of the channel (phasing vector) of path i.

The multiplier (21) multiplies received symbol vector Ri by complex conjugate number $\hat{\xi}i^*$ of estimated channel value $\hat{\xi}i$ for weighting and phase compensation in proportion to the amplitude of estimated channel value $\hat{\xi}i$. The synthesizer (12) synthesizes the signal output from the multiplier (21) corresponding to the path at the maximum ratio (by rake synthesis).

The synthesizer (24) synthesizes the absolute value of $\Sigma R_i\hat{\xi}_i^*$ to obtain the total amplitude $\Sigma|R_i\hat{\xi}_i^*|$ of the received symbol vector. The synthesizer (25) synthesizes estimated channel value $\hat{\xi}i$ to obtain the total amplitude $\Sigma|\hat{\xi}_i^*|$ of estimated channel value $\hat{\xi}i$. Total amplitude $\Sigma|R_i\hat{\xi}i^*|$ of the received symbol vector and total amplitude $\Sigma|\hat{\xi}_i^*|$ of the estimated channel value are input to the decision unit (13).

The decision unit (13) has a comparator and hard-soft decision unit. The comparator compares total amplitude $\Sigma|\hat{\xi}_i^*|$ of estimated channel value $\hat{\xi}i$ input from the synthesis unit (25) with total amplitude $\Sigma|R_i\hat{\xi}_i^*|$ of the synthesized received symbol vector input from the synthesis unit (24). When the result of comparison is as follows, the hard-soft decision unit executes hard decision:

$$\Sigma|\hat{\xi}_i^*| \leq \Sigma|R_i\hat{\xi}_i^*|$$

When the result of comparison is as follows, the hard-soft decision unit executes soft decision:

$$\Sigma|\hat{\xi}_i^*| > \Sigma|R_i\hat{\xi}_i^*|$$

The soft decision compensates for the phase shift of the vector signal while maintaining a constant amplitude.

Estimated information symbol vector $\hat{Zs}$ output from the decision unit (13) is input to the spreading unit (14) corresponding to the despreading unit (11). In the spreading unit (14), the multiplier (22) multiplies the input estimated information symbol vector $\hat{Zs}$ by estimated channel value $\hat{\xi}i$ and outputs the interference replica signal $S_{m,j}$ to the next stage. Interference replica signal $S_{m-1,j}$ is subtracted from output interference replica signal $S_{m,j}$, and the result is spread according to the spreading code by the spreading unit (19). Then the signal is synthesized by the second synthesis unit (15) and output as estimated interference residual signal $d_{m,j}$ to the next stage.

Figure 6:
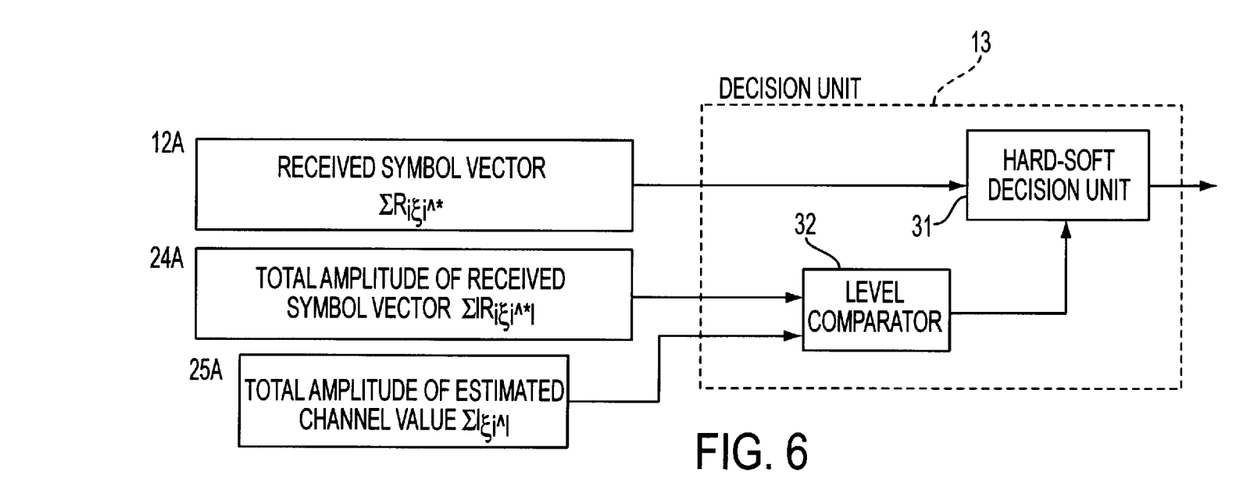
FIG. 6 shows the decision unit of FIG. 5 and detailed operations executed thereby.

FIG. 6 shows an embodiment of the decision unit (13) of FIG. 5. In FIG. 6, "31" indicates a hard-soft decision unit, "32" a level comparator, and "12A" the received symbol vector $\Sigma R_i\hat{\xi}_i^*$ obtained after rake synthesis by the first synthesis unit (12). Also, "24A" indicates total amplitudes $\Sigma|R_i\hat{\xi}_i^*|$ of the received symbol vector obtained after rake synthesis by the synthesis unit (24), and "25A" the total amplitude $\Sigma|\hat{\xi}_i^*|$ of the estimated channel value obtained by the synthesis unit (25).

The decision unit (13) has the hard-soft decision unit (31) and the level comparator (32) connected to each other. The level comparator compares the total amplitude $\Sigma|R_i\hat{\xi}_i^*|$ of received symbol vector obtained by rake synthesis by the synthesis unit (24) shown in FIG. 5 with total amplitude $\Sigma|\hat{\xi}_i^*|$ of the estimated channel value obtained by the synthesis unit (25). The hard-soft decision unit (31) executes a hard or soft decision for received symbol vector $\Sigma R_i\hat{\xi}_i^*$ obtained after rake synthesis by the synthesis unit (12) shown in FIG. 5 according to the result of comparison by the level comparator (32). When the result of comparison the comparator (32) is as follows, the decision unit executes hard decision.

$$\Sigma|\hat{\xi}_i^*| \leq \Sigma|R_i\hat{\xi}_i^*|$$

When the result of comparison by the comparator (32) is as follows, the decision unit executes soft decision.

$$\Sigma|\hat{\xi}_i^*| > \Sigma|R_i\hat{\xi}_i^*|$$

Figure 7:
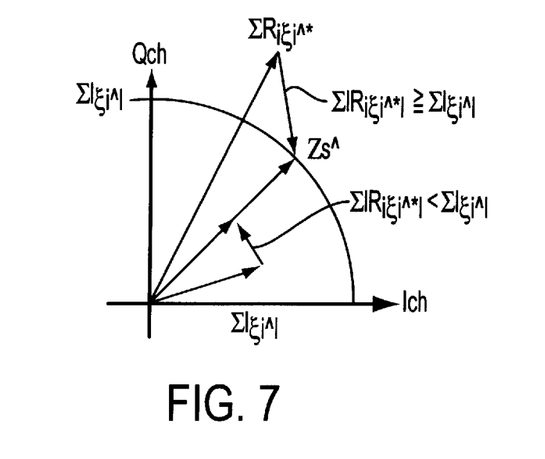
FIG. 7 shows an example of the signal space where the decision unit of the present invention executes hard or soft decision for the received signal to which QPSK modulation is applied in the configuration shown in FIG. 6.

The following describes how soft decision is executed in the embodiment shown in FIG. 6. FIG. 7 shows an example of the signal space where the decision unit (13) evaluates the received signal to which QPSK modulation is applied. When the result of comparison by the level comparator in the decision unit (13) is as follows, estimated information symbol vector $\hat{Zs}$ (compensated so that its vector signal is normal) becomes the output signal for tentative decision:

$$\Sigma|\hat{\xi}_i^*| \leq \Sigma|R_i\hat{\xi}_i^*|$$

When the result of comparison by the level comparator in the decision unit (13) is as follows, soft decision is executed because the vector signal is low in level and reliability. Soft decision compensates for the phase shift of the signal while maintaining a constant amplitude.

$$\Sigma|\hat{\xi}_i^*| > \Sigma|R_i\hat{\xi}_i^*|$$

Compared with estimated information symbol vector $\hat{Zs}$ output after hard decision, estimated symbol vector $\hat{Zs}$ output after soft decision has a lower level. Thus, the adverse effect by decision error on subsequent stages can be reduced.

Figures 8, 9:
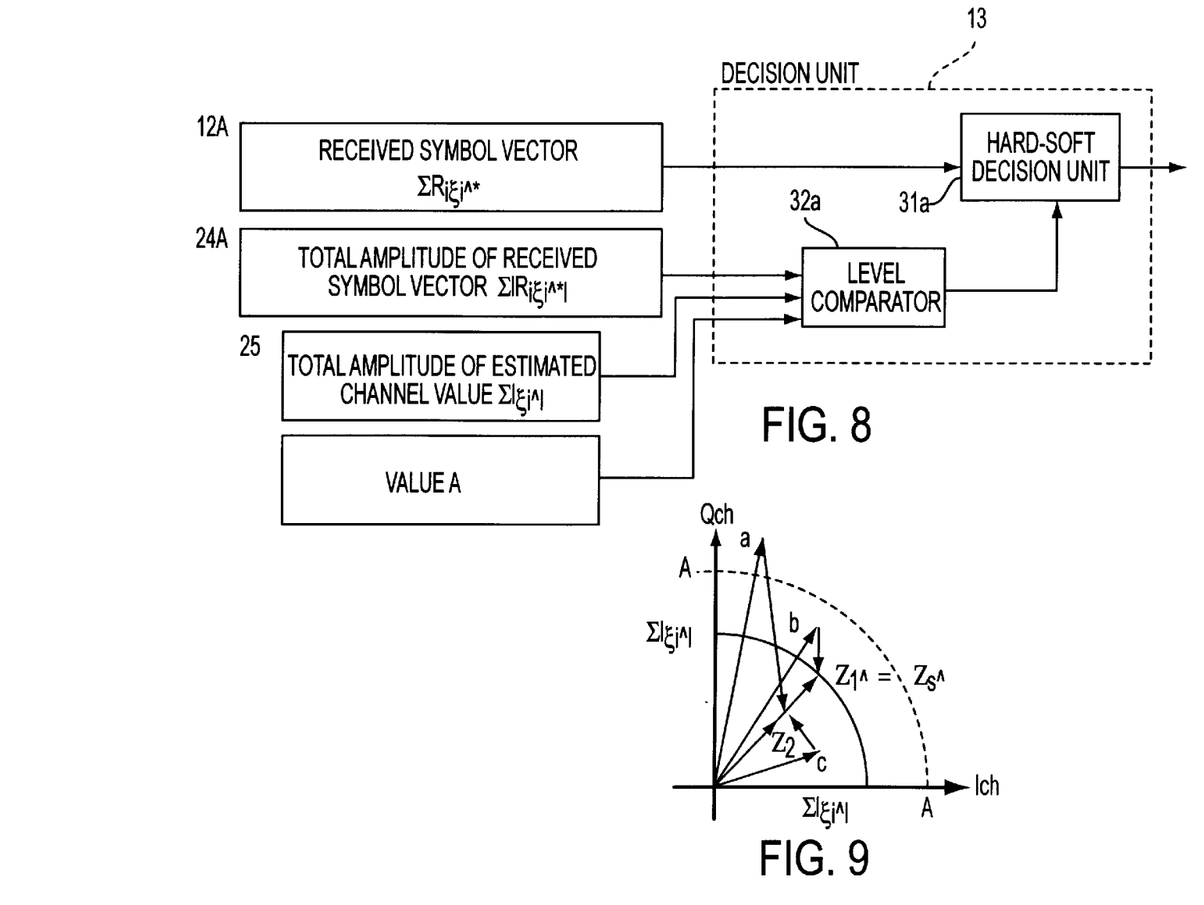
FIG. 8 shows another example of detailed operations of the decision unit shown in FIG. 5.
FIG. 9 shows an example of the signal space where the decision unit executes hard or soft decision for the received signal to which QPSk modulation is applied in the configuration shown in FIG. 8.

FIG. 8 shows another example of detailed operations related to the decision unit (13) shown in FIG. 5. In FIG. 8, "31a" indicates a hard-soft decision unit, "32a" a level comparator, and "12A" the received symbol vector $\Sigma R_i\hat{\xi}_i^*$ obtained after rake synthesis by the first synthesis unit (12). Also, "24A" indicates total amplitude $\Sigma|R_i\hat{\xi}_i^*|$ of the received symbol vector obtained after rake synthesis by the synthesis unit (24), and "25A" indicates total amplitude $\Sigma|\xi_i^{\wedge *}|$ of the estimated channel value obtained by the synthesis unit (25).

Value A is preset as a value larger than the total amplitude $\Sigma|\xi_i^{\wedge *}|$ of the estimated channel value, and used as a reference value by the comparator (32a). Value A is preset in consideration of the maximum value, phasing, and interference that can be expected when a normal multipath signal is synthesized at the maximum ratio. Value A can also be determined on the experimental basis. The level comparator (32a) compares the total amplitude $\Sigma|R_i\xi_i^{\wedge *}|$ of the received symbol vector, the total amplitude $\Sigma|\xi_i^{\wedge *}|$ of the estimated channel value, and preset value A to determine the order of collation. The level comparator then outputs the result of comparison.

When the result of comparison by the level comparator (32a) is as follows, the hard-soft decision unit executes hard decision:

$$\Sigma|\xi_i^{\wedge}| \leq \Sigma|R_i\xi_i^{\wedge *}| < A$$

When the result of comparison by the level comparator (32a) is as follows, the hard-soft decision unit executes soft decision (i.e., compensated for the phase shift but maintains the amplitude):

$$\Sigma|\xi_i^{\wedge}| > \Sigma|R_i\xi_i^{\wedge *}|$$

When the result of comparison by the level comparator (32a) is as follows, the hard-soft decision unit executes soft decision:

$$A \leq \Sigma|R_i\xi_i^{\wedge *}i|$$

In the latter case, the decision unit 13 also multiplies the amplitude by a weight value so that the amplitude is less than Zs^ to obtain an estimated value. The weight value is determined by the number of users currently connected to the system. The weight value must be smaller when there are more users because the influence of decision error is larger. The above decision may be replaced with a decision method that assumes that the amplitude is a specific value less than Zs^.

The following explains detailed operations of hard and soft decision in the example shown in FIG. 8. FIG. 9 shows an example of the signal space where the decision unit (13) executes decision for the received signal to which QPSK modulation is applied. Assume that the result of comparison by the level comparator in the decision unit (13) is as follows (e.g., vector b in the figure):

$$\Sigma|\xi_i^{\wedge}| \leq \Sigma|R_i\xi_i^{\wedge *}| < A$$

In this case, estimated information symbol vector Z1^ (whose phase and amplitude is compensated to be normal) is the output signal used for tentative decision. Here, "Z1^" is equivalent to "Zs^". Next, assume that the result of comparison by the level comparator in the decision unit (13) is as follows (e.g., vector c in the figure):

$$\Sigma|\xi_i^{\wedge}| > \Sigma|R_i\xi_i^{\wedge *}|$$

In this case, the phase of the signal is compensated while maintaining its amplitude (by soft decision) because the signal is low in level and reliability.

Next, assume that the result of comparison by the level comparator in the decision unit (13) is as follows (e.g., vector a in the figure):

$$A \leq \Sigma|R_i\xi_i^{\wedge *}|$$

In this case, only the phase is compensated by soft decision as previously described, and the amplitude is multiplied by a certain weight value. The decision result has an amplitude value less than Z1^. As described before, the decision output signal can have an amplitude value (e.g., Z2^ in the figure) less than Z1^. Similar to the weight value described before, amplitude value Z2^ is determined by considering the number of users currently connected to the system.

If the total amplitude of received symbol vector $\Sigma R_i\xi_i^{\wedge *}$ obtained after the rake synthesis exceeds preset value A, the signal level is increased abnormally because noise is superimposed on the signal in equivalent phases and the reliability of the signal is low. When the level of the signal is lowered to the total amplitude of estimated channel value $\xi i^{\wedge}$ and the signal is evaluated, decision error can be reduced. Thus, the cancellation characteristic can be improved.

Figures 10, 11:
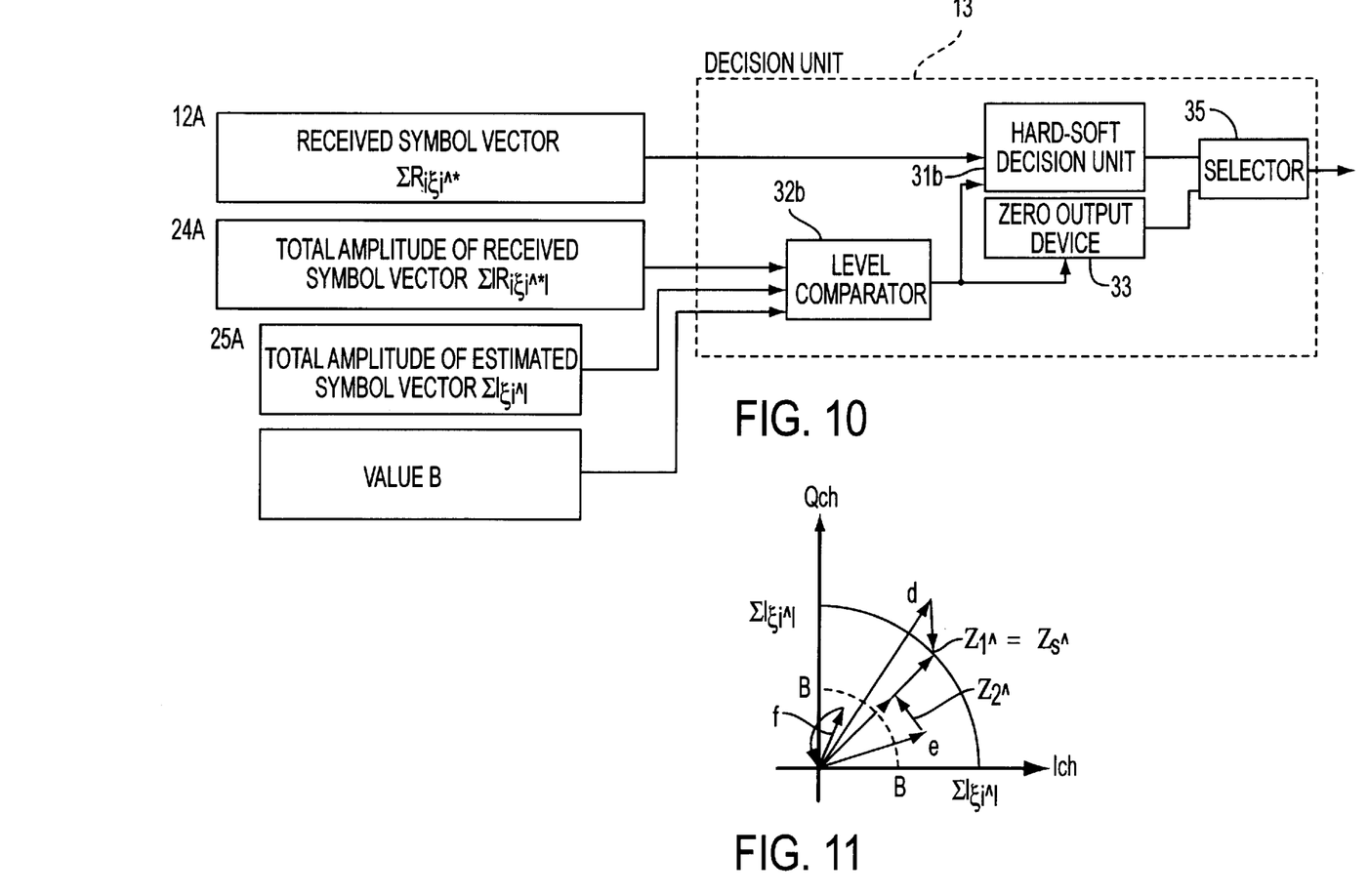
FIG. 10 shows yet another example of the decision unit and detailed operations executed thereby.
FIG. 11 shows an example of the signal space where the decision unit executes hard or soft decision for the received signal to which QPSK modulation is applied in the configuration shown in FIG. 10.

FIG. 10 shows yet another embodiment of the decision unit (13) shown in FIG. 5. In FIG. 10, "31b" indicates a hard-soft decision unit, "32b" a level comparator, and "33" a zero output device. Also, "12A" indicates the received symbol vector $\Sigma R_i\xi_i^{\wedge *}$ obtained after rake synthesis by the first synthesis unit (12), "24A" indicates the total amplitude $\Sigma|R_i\xi_i^{\wedge *}|$ of the received symbol vector obtained after rake synthesis by the synthesis unit (24), and "25A" indicates the total amplitude $\Sigma|\xi_i^{\wedge *}|$ of the estimated channel value obtained by the synthesis unit (25). Value B is preset as a value less than total amplitude $\Sigma|\xi_i^{\wedge *}|$ of the estimated channel value, and used as a reference value by the comparator (32b). The level comparator (32b) compares total amplitude $\Sigma|R_i\xi i^{\wedge *}|$ of the received symbol vector, total amplitude $\Sigma|\xi i^{\wedge *}|$ of the estimated channel value, and preset value B to determine the order of collation. Then the level comparator outputs the result of comparison.

When the result of comparison by the level comparator (32b) is as follows, the selector (35) selects the signal output from the zero output device (33) and outputs it:

$$B > \Sigma|R_i\xi_i^{\wedge *}|$$

When the result of comparison by the level comparator (32b) is anything else, the selector selects the signal output from the hard-soft decision unit (31b) and outputs it.

When the result of comparison by the level comparator (32b) is as follows, the hard-soft decision unit (31a) executes hard decision as described before:

$$\Sigma|\xi_i^{\wedge}| \leq \Sigma|R_i\xi i^{\wedge *}|$$

When the result of comparison by the level comparator (32b) is as follows, the hard-soft decision unit (31b) executes soft decision:

$$\Sigma|\xi i^{\wedge}| > \Sigma|R_i\xi i^{\wedge *}| > B$$

The following explains detailed operations of hard and soft decision in the embodiment shown in FIG. 10. FIG. 11 shows an example of the signal space where the decision unit (13) executes decision for the received signal to which QPSK modulation is applied. Assume that the result of comparison by the level comparator in the decision unit (13) is as follows (e.g., vector d in the figure):

$$\Sigma|\xi i^{\wedge}| \leq \Sigma|R_i\xi i^{\wedge *}|$$

In this case, estimated information symbol vector Z1^ (whose phase and amplitude is compensated to be normal) is output as the output signal for tentative decision from the selector (35). Here, "Z1^" is equivalent to "Zs^". Next, assume that the result of comparison by the level comparator in the decision unit (13) is as follows (e.g., vector e in the figure):

$$\Sigma|\xi i^{\wedge}| > \Sigma|R_i\xi i^{\wedge}*| > B$$

In this case, the phase of the signal is compensated while its amplitude is maintained (by soft decision) because the signal is low in level and reliability. The decision result is output as an output signal for tentative decision from the selector (35). Next, assume that the result of comparison by the level comparator in the decision unit (13) is as follows (e.g., vector f in the figure):

$$B > \Sigma|R_i\xi i^{\wedge}*|$$

In this case, the hard-soft decision unit does not execute decision. Then the zero output device (33) outputs zero as the output signal for tentative decision via the selector (35).

If the total amplitude of received symbol vector $\Sigma R_i\xi_i^{\wedge}*$ obtained after the rake synthesis is less than preset value B, zero is output as the estimated information vector because the reliability of the signal is very low. Thus, decision error can be reduced and the cancellation characteristic can be improved.

Figure 12:
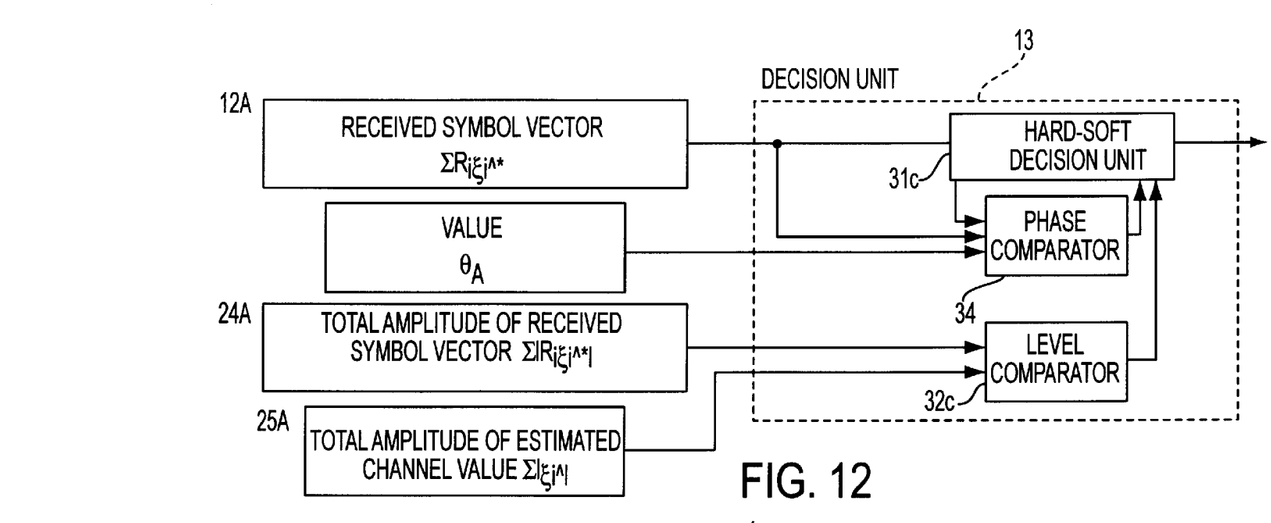
FIG. 12 shows still another example of the decision unit and detailed operations performed thereby.

FIG. 12 shows yet another embodiment of the decision unit (13) shown in FIG. 5. In FIG. 12, "31c" indicates a hard-soft decision unit, "32c" a level comparator, and "34" a phase comparator. Also, "12A" indicates received symbol vector $\Sigma R_i\xi i^{\wedge}*$ obtained after rake synthesis by the first synthesis unit (12), "24A" indicates the total amplitude $\Sigma R_i\xi i^{\wedge}*$ of the received symbol vector obtained after rake synthesis by the synthesis unit (24), and "25A" indicates the total amplitude $\Sigma|\xi i^{\wedge}*|$ of the estimated channel value obtained by the synthesis unit (25). Value $\theta_A$ is preset as a value less than $\pi/4$, and used as a reference value by the phase comparator (34). Value $\theta_A$ is preset in a range where the phase difference from the normal phase in each quadrant can be properly maintained. The phase comparator receives input of total amplitude $\Sigma|R_i\xi i^{\wedge}*|$ of the received symbol vector and hard decision output from the hard-soft decision unit (13). The phase comparator calculates the phase difference $\theta$ between both input signals and compares phase difference $\theta$ with preset value $\theta_A$ to determine the order of collation. The phase comparator then outputs the result of comparison.

Assume that the results of comparison by the level comparator (32c) and phase comparator (34) are as follows:

$$\Sigma|\xi i^{\wedge}| \leq \Sigma|R_i\xi i^{\wedge}*| \theta < \theta_A$$

Figure 13:
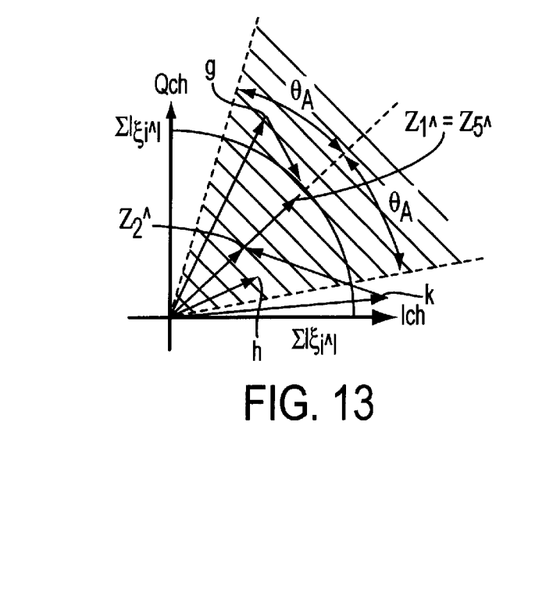
FIG. 13 shows an example of the signal space where the decision unit of FIG. 12 executes hard or soft decision for the received signal to which QPSK modulation is applied.

In this case (e.g., vector g in the figure), high reliability is determined. Then the estimated information symbol vector (which is the result of hard decision) is output as the output signal for tentative decision as described before. Next, assume that the results of comparison by the level comparator (32c) and phase comparator (34) are as follows:

$$\Sigma|\xi i^{\wedge}| > \Sigma|R_i\xi i^{\wedge}*| \theta < \theta_A$$

In this case (e.g., vector h in the figure), the result of soft decision (only the phase is compensated) is output as the output signal for tentative decision as described before. Next, assume that the result of comparison by the phase comparator (34) is as follows regardless of the result of comparison by the level comparator (32c):

$$\theta > \theta_A$$

In this case (e.g., vector k in the figure), low reliability is determined. Then estimated information symbol vector Z2^ is output as the output signal for tentative decision with an amplitude less than the total amplitude of estimated channel value Z1^.

Even if the total amplitude $\Sigma|R_i\xi i^{\wedge}*|$ of the received symbol vector is larger than the total amplitude $\Sigma|\xi i^{\wedge}*|$ of the estimated channel value, low reliability is determined in specific cases. Low reliability is determined when phase difference $\theta$ between estimated information symbol vector Z1^ (as the result of hard decision) and received symbol vector $\Sigma R_i\xi i^{\wedge}*$ exceeds preset value $\theta_A$. This is because these vectors have phases close to adjacent quadrants. In such a case, the level of the signal can be changed to less than the total amplitude of the estimated channel value to suppress decision error caused by a large phase difference within a quadrant. Thus, the cancellation characteristic can be improved.

Applications of this invention are not limited to previously described formats of implementation, but can be modified for various purposes. Different formats of implementation can also be combined. For instance, preset values A and B can be combined as follows. When the total amplitude of the received symbol vector exceeds the level specified by preset value A, the amplitude is changed to a lower level and soft decision is executed. When the total amplitude of the received symbol vector does not exceed the level specified by preset value B, zero is output. In addition, the decision unit (13) can be easily created in software by using a digital signal processor or field programmable gate array. The same procedure can also be easily created using a circuit.

As described above, the interference canceller compares the total amplitudes of the received symbol vector and estimated channel value, and compares preset values A and B. The reliability of the received symbol vector is judged through comparison. When high reliability is determined, hard decision is executed. When low reliability is determined, soft decision is executed with or without the level being lowered. Thus, decision error can be reduced and the accuracy of interference replica signal $d_m$ and estimated interference residual signal $S_m$ output from each interference canceller unit can be increased. By increasing accuracy, the interference removal characteristics of the interference canceller can be improved.

What is claimed is:

1. A multistage interference canceller for cancelling interference as a communication system from an input signal, the interference canceller comprising:

a plurality of despreading units inputted with an error signal and an interference replica signal to produce received symbol vector and an estimated channel value;

a synthesis unit to synthesize said received symbol vector, an amplitude of the received symbol vector and an amplitude of the estimated channel value from each despreading unit, respectively;

a decision unit to evaluate said received symbol vector by hard-soft decision according to a result of comparing the total amplitude of the received symbol vector and a total estimated channel value and output an information symbol vector; and a plurality of spreading units inputted with said information symbol vector and said interference replica signal to produce an interference residual signal and a new interference replica signal outputted to the next stage of the interference canceller.

2. The interference canceller according to claim 1, wherein each despreading unit includes a channel estimation unit and said decision unit includes a comparator which compares the total amplitude of the received symbol vector output from said synthesis unit with the total amplitude of the estimated channel value output from said channel estimation unit, and a hard-soft decision unit which executes a hard decision when the total amplitude of the received symbol vector is equal to or greater than that of the estimated channel value as a result of comparison by the comparator, or soft decision when the result of comparison is otherwise.

3. A method of tentative decision in an interference canceller which includes an interference canceller unit including a despreader, a channel estimation unit, a despreading unit which inputs received signals or error and interference replica signals from a previous stage, a first synthesis unit which synthesizes a signal output from the despreading unit, a decision unit which evaluates a signal output from the first synthesis unit, a spreader, a spreading unit which inputs a decision output signal from said decision unit and the estimated channel value from said despreading unit, and a second synthesis unit which synthesizes the signal output from the spreading unit and outputs an estimated interference residual signal, the method of tentative decision comprising the steps of:

switching of decision operations by said decision unit of the said interference canceller unit;

comparing in said decision unit the total amplitude of a received symbol vector output from the first synthesis unit with the total amplitude of the estimated channel value output from the channel estimation unit;

executing by the decision unit a hard decision when the total amplitude of the received symbol vector output from the first synthesis unit is equal to or greater than the total amplitude of the estimated channel value, or executes soft decision when the total amplitude of the received symbol vector output from the first synthesis unit is less than the total amplitude of the estimated channel value.

* * * * *